US012335920B2

(12) United States Patent
Gummadi et al.

(10) Patent No.: US 12,335,920 B2
(45) Date of Patent: Jun. 17, 2025

(54) REQUESTING SIDELINK RESOURCES FOR SIDELINK COMMUNICATIONS OUTSIDE OF A NETWORK SERVICE REGION

(71) Applicant: QUALCOMM Incorporated, San Diego, CA (US)

(72) Inventors: Bapineedu Chowdary Gummadi, Hyderabad (IN); Ramprasad Majjari, Nellore (IN); Sravan Kumar Gullapally, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 17/660,181

(22) Filed: Apr. 21, 2022

(65) Prior Publication Data

US 2023/0345418 A1 Oct. 26, 2023

(51) Int. Cl.
*H04W 72/02* (2009.01)
*H04L 1/20* (2006.01)
*H04W 72/51* (2023.01)
*H04W 92/18* (2009.01)

(52) U.S. Cl.
CPC ............ *H04W 72/02* (2013.01); *H04L 1/203* (2013.01); *H04W 72/51* (2023.01); *H04W 92/18* (2013.01)

(58) Field of Classification Search
CPC ..... H04W 72/02; H04W 72/51; H04W 92/18; H04W 76/14; H04W 72/20; H04L 1/203
USPC .......................................................... 370/329
See application file for complete search history.

(56) References Cited

U.S. PATENT DOCUMENTS

| | | | |
|---|---|---|---|
| 11,564,208 B1* | 1/2023 | Kuo | H04W 40/22 |
| 2020/0288477 A1* | 9/2020 | El Assaad | H04W 4/40 |
| 2021/0045093 A1* | 2/2021 | Rao | H04W 76/14 |
| 2021/0204217 A1* | 7/2021 | Balasubramanian | H04W 4/00 |
| 2021/0289380 A1* | 9/2021 | Chae | H04W 72/54 |
| 2021/0306886 A1* | 9/2021 | Jung | H04B 17/373 |
| 2022/0039082 A1 | 2/2022 | Belleschi et al. | |
| 2022/0070850 A1* | 3/2022 | Hosseini | H04L 5/0094 |

(Continued)

FOREIGN PATENT DOCUMENTS

WO WO-2021234164 A2 11/2021

OTHER PUBLICATIONS

Huawei, et al., "Discussion on Sidelink Resource Allocation Mode 1", 3GPP TSG RAN WG1 Meeting #96bis, R1-1903950, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 2, 2019, 8 Pages, XP051707065, Introduction, p. 1 section 1.4, p. 4-p. 5, section 1.5, p. 5 section 2.1, p. 6-p. 7.

(Continued)

*Primary Examiner* — Kwang B Yao
*Assistant Examiner* — Syed M Bokhari
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may transmit assistance information while the UE is located in a network service region and based at least in part on a prediction that the UE will leave the network service region. The UE may receive, based at least in part on the assistance information, an allocation of a set of sidelink resources. Numerous other aspects are provided.

25 Claims, 10 Drawing Sheets

(56) References Cited

U.S. PATENT DOCUMENTS

2022/0070890 A1 3/2022 Hosseini et al.
2024/0023143 A1* 1/2024 Wang .................... G01S 5/0236
2024/0089337 A1* 3/2024 Wakabayashi ...... H04W 72/044

OTHER PUBLICATIONS

Partial International Search Report—PCT/US2023/015883—ISA/EPO—Jul. 4, 2023.
Fraunhofer HHI., et al., "Designs for NR V2X Mode 2 Resource Allocation", 3GPP TSG RAN WG1 Meeting #95, R1-1812399, 3rd Generation Partnership Project, Mobile Competence Centre, 650, Route Des Lucioles, F-06921 Sophia-Antipolis Cedex, France vol. RAN WG1, No. Spokane, USA, Nov. 12, 2018-Nov. 16, 2018, Nov. 11, 2018, 10 Pages, XP051554315, Section 2, p. 2-p. 4 Section 4.1, p. 6 Section 4.3, p. 8.
International Search Report and Written Opinion—PCT/US2023/015883—ISA/EPO—Sep. 14, 2023.

\* cited by examiner

REQUESTING SIDELINK RESOURCES FOR SIDELINK COMMUNICATIONS OUTSIDE OF A NETWORK SERVICE REGION

FIELD OF THE DISCLOSURE

Aspects of the present disclosure generally relate to wireless communication and to techniques and apparatuses for requesting sidelink resources for sidelink communications outside of a network service region.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to transmit assistance information while the UE is located in a network service region and based at least in part on a prediction that the UE will leave the network service region. The one or more processors may be configured to receive, based at least in part on the assistance information, an allocation of a set of sidelink resources.

Some aspects described herein relate to a first UE for wireless communication. The first UE may include a memory and one or more processors coupled to the memory. The one or more processors may be configured to transmit an indication of a sidelink resource preference to a second UE based at least in part on a determination that the second UE is within a network service region. The one or more processors may be configured to receive, from the second UE and based at least in part on transmitting the indication of the sidelink resource preference, an indication of an allocation of a set of sidelink resources.

Some aspects described herein relate to a first UE for wireless communication. The first UE may include a memory and one or more processors coupled to the memory. The one or more processors may be configured to receive an indication of a sidelink resource preference from a second UE. The one or more processors may be configured to transmit, to the second UE and based at least in part on receiving the indication of the sidelink resource preference, an indication of an allocation of a set of sidelink resources.

Some aspects described herein relate to a method of wireless communication performed by a UE. The method may include transmitting assistance information while the UE is located in a network service region and based at least in part on a prediction that the UE will leave the network service region. The method may include receiving, based at least in part on the assistance information, an allocation of a set of sidelink resources.

Some aspects described herein relate to a method of wireless communication performed by a first UE. The method may include transmitting an indication of a sidelink resource preference to a second UE based at least in part on a determination that the second UE is within a network service region. The method may include receiving, from the second UE and based at least in part on transmitting the indication of the sidelink resource preference, an indication of an allocation of a set of sidelink resources.

Some aspects described herein relate to a method of wireless communication performed by a first UE. The method may include receiving an indication of a sidelink resource preference from a second UE. The method may include transmitting, to the second UE and based at least in part on receiving the indication of the sidelink resource preference, an indication of an allocation of a set of sidelink resources.

Some aspects described herein relate to a non-transitory computer-readable medium that stores a set of instructions for wireless communication by a UE. The set of instructions, when executed by one or more processors of the UE, may cause the UE to transmit assistance information while the UE is located in a network service region and based at least in part on a prediction that the UE will leave the network service region. The set of instructions, when executed by one or more processors of the UE, may cause the UE to receive, based at least in part on the assistance information, an allocation of a set of sidelink resources.

Some aspects described herein relate to a non-transitory computer-readable medium that stores a set of instructions for wireless communication by a first UE. The set of instructions, when executed by one or more processors of the first UE, may cause the first UE to transmit an indication of a sidelink resource preference to a second UE based at least in part on a determination that the second UE is within a network service region. The set of instructions, when executed by one or more processors of the first UE, may cause the first UE to receive, from the second UE and based at least in part on transmitting the indication of the sidelink resource preference, an indication of an allocation of a set of sidelink resources.

Some aspects described herein relate to a non-transitory computer-readable medium that stores a set of instructions for wireless communication by a first UE. The set of instructions, when executed by one or more processors of the first UE, may cause the first UE to receive an indication of a sidelink resource preference from a second UE. The set of instructions, when executed by one or more processors of the first UE, may cause the first UE to transmit, to the second UE and based at least in part on receiving the indication of the sidelink resource preference, an indication of an allocation of a set of sidelink resources.

Some aspects described herein relate to an apparatus for wireless communication. The apparatus may include means for transmitting assistance information while the apparatus is located in a network service region and based at least in part on a prediction that the apparatus will leave the network service region. The apparatus may include means for receiving, based at least in part on the assistance information, an allocation of a set of sidelink resources.

Some aspects described herein relate to an apparatus for wireless communication. The apparatus may include means for transmitting an indication of a sidelink resource preference to a UE based at least in part on a determination that the UE is within a network service region. The apparatus may include means for receiving, from the UE and based at least in part on transmitting the indication of the sidelink resource preference, an indication of an allocation of a set of sidelink resources.

Some aspects described herein relate to an apparatus for wireless communication. The apparatus may include means for receiving an indication of a sidelink resource preference from a UE. The apparatus may include means for transmitting, to the UE and based at least in part on receiving the indication of the sidelink resource preference, an indication of an allocation of a set of sidelink resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
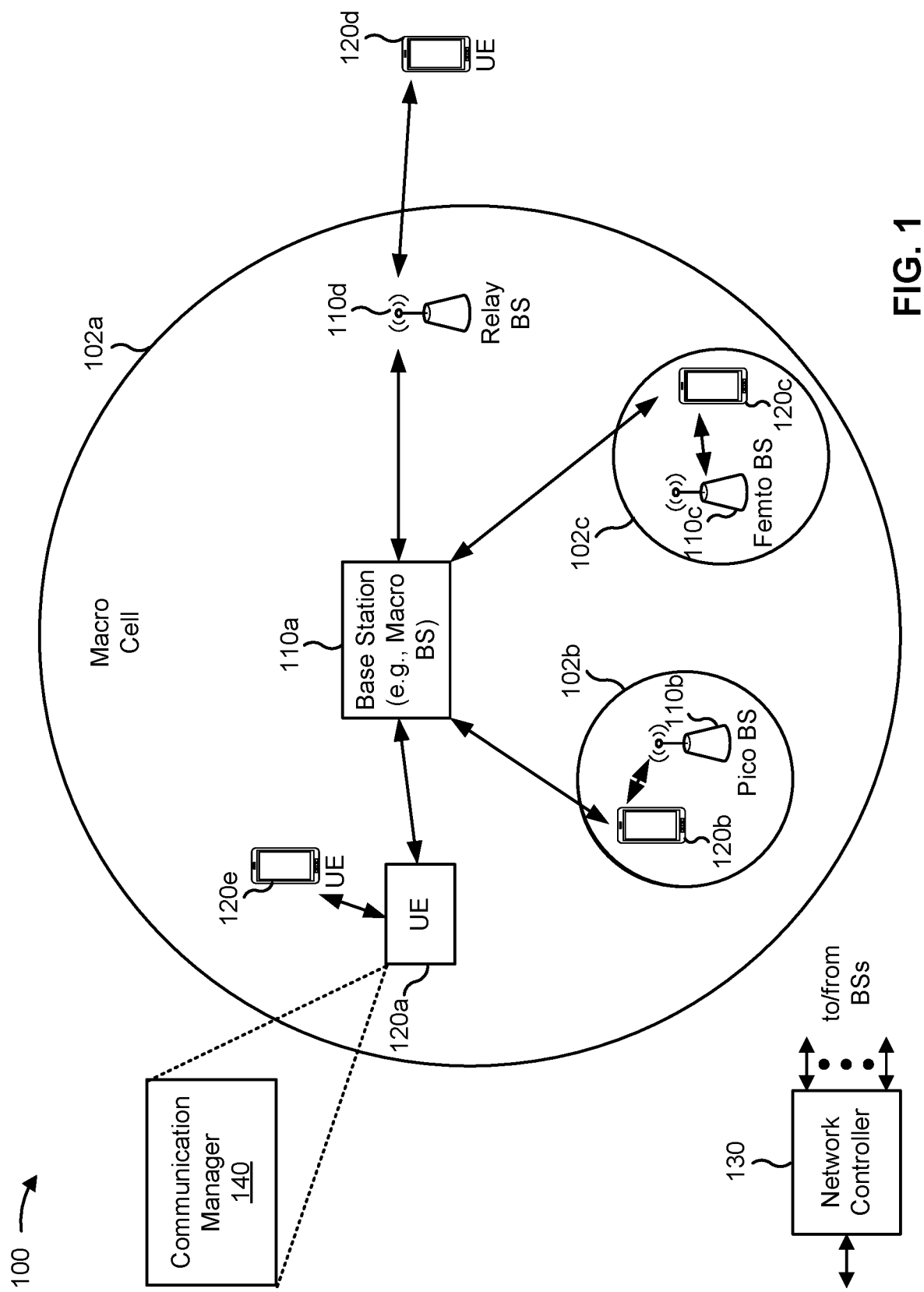
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a,
the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a network node, which may be referred to as a "node," a "network node," or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, a UE (e.g., the UE 120) may include a communication manager 140. In some aspects, the communication manager 140 may include one or more processors and/or processor-readable code stored in memory that, when executed by the one or more processors, causes the UE to perform one or more operations, as described herein. For example, as described in more detail elsewhere herein, the communication manager 140 may transmit assistance information while the UE is located in a network service region and based at least in part on a prediction that the UE will leave the network service region; and receive, based at least in part on the assistance information, an allocation of a set of sidelink resources. As described in more detail elsewhere herein, the communication manager 140 may transmit an indication of a sidelink resource preference to a second UE based at least in part on a determination that the second UE is within a network service region; and receive, from the second UE and based at least in part on transmitting the indication of the sidelink resource preference, an indication of an allocation of a set of sidelink resources. As described in more detail elsewhere herein, the communication manager 140 may receive an indication of a sidelink resource preference from a second UE; and transmit, to the second UE and based at least in part on receiving the indication of the sidelink resource preference, an indication of an allocation of a set of sidelink resources. Additionally, or alternatively, the communication manager 140 may perform one or more other operations described herein.

As indicated above, FIG. 1 is provided as an example. Other examples may differ from what is described with regard to FIG. 1.

Figure 2:
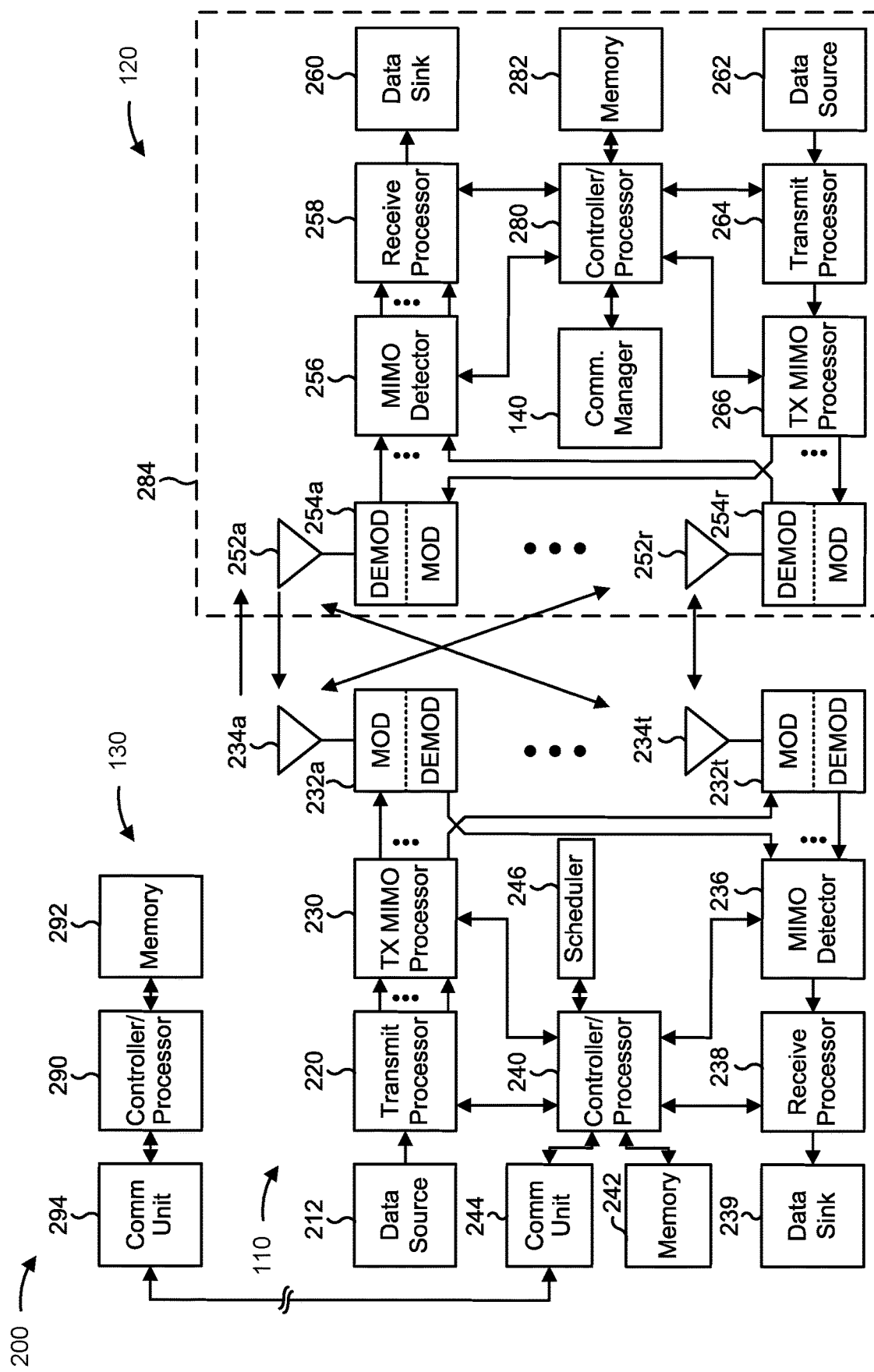
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

In some aspects, the term "base station" (e.g., the base station 110), "network node," or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with requesting sidelink resources for sidelink communications outside of a network service region, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting assistance information while the UE is located in a network service region and based at least in part on a prediction that the UE will leave the network service region; and/or means for receiving, based at least in part on the assistance information, an allocation of a set of sidelink resources. In some aspects, a first UE includes means for transmitting an indication of a sidelink resource preference to a second UE based at least in part on a determination that the second UE is within a network service region; and/or means for receiving, from the second UE and based at least in part on transmitting the indication of the sidelink resource preference, an indication of an allocation of a set of sidelink resources. In some aspects, the first UE includes means for receiving an indication of a sidelink resource preference from a second UE; and/or means for transmitting, to the second UE and based at least in part on receiving the indication of the sidelink resource preference, an indication of an allocation of a set of sidelink resources. The means for the UE and/or the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
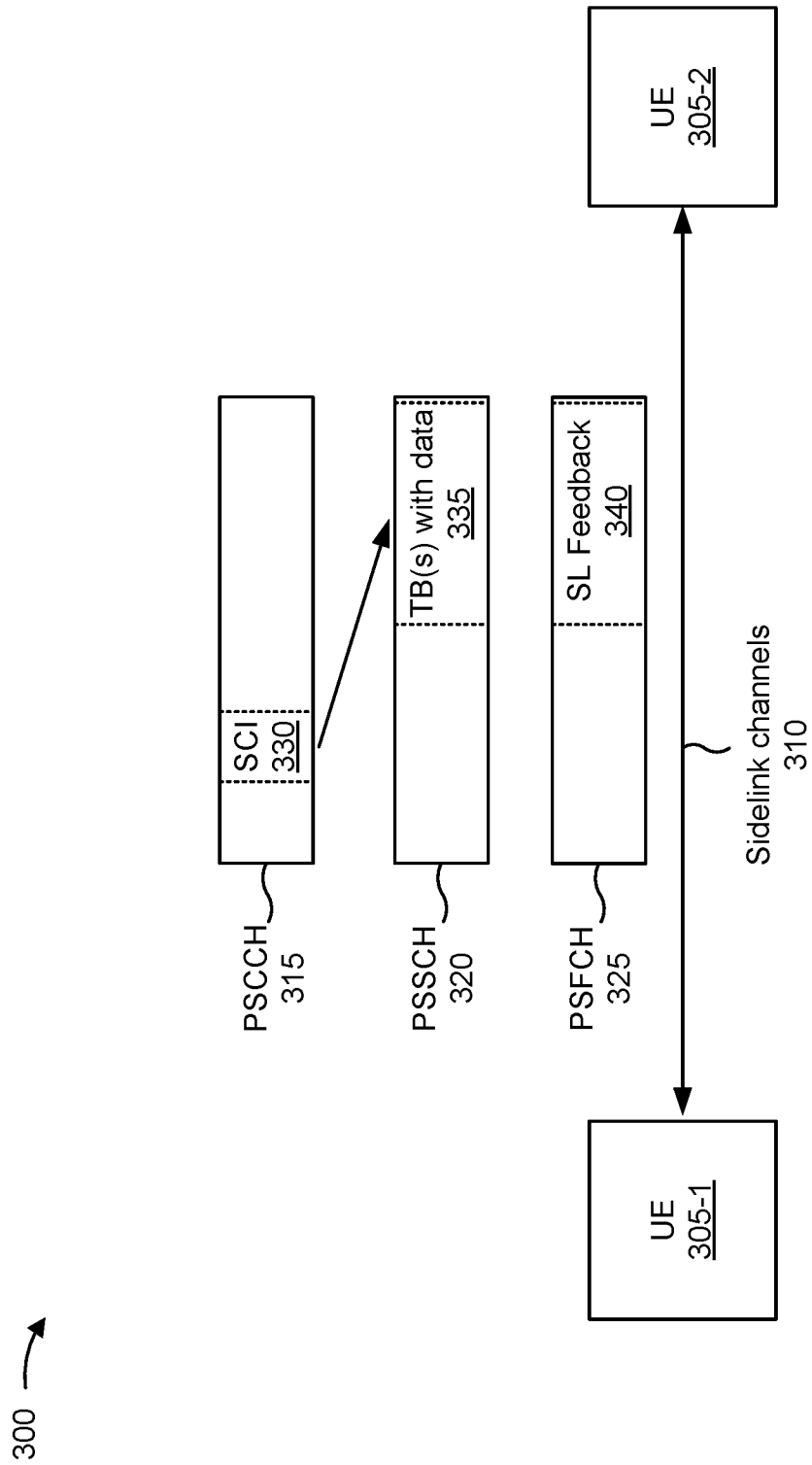
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARM) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2). A Mode 2 resource selection operation is an operation in which resource selection and/or scheduling is performed by the UE 305 (e.g., rather than a base station 110). In some aspects, the UE 305 may perform Mode 2 resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
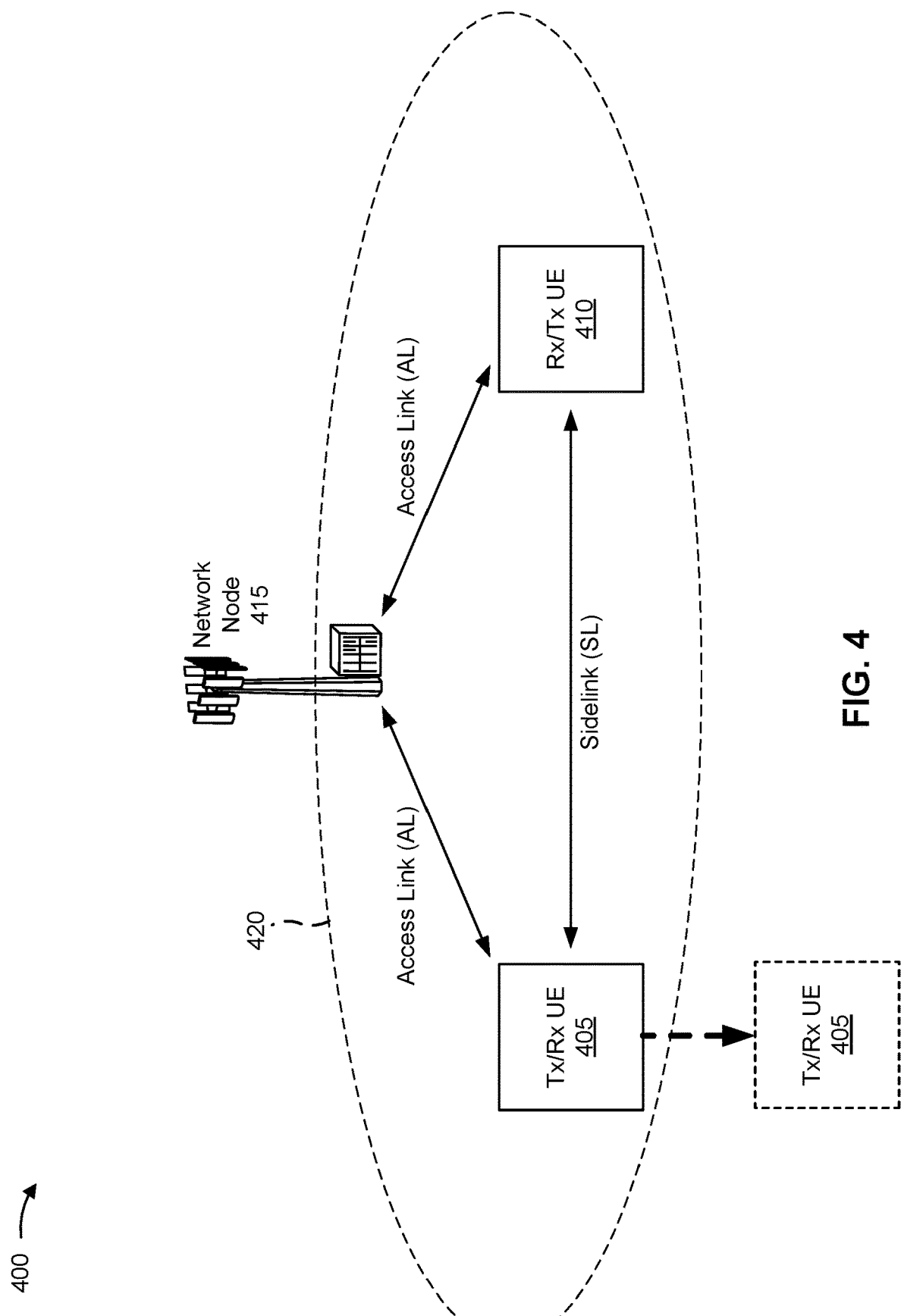
FIG. 4 is a diagram illustrating an example of sidelink communications and access link communications.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a network node 415 may communicate with the Tx/Rx UE 405 via a first access link. Additionally, or alternatively, in some sidelink modes, the network node 415 may communicate with the Rx/Tx UE 410 via a second access link. The Tx/Rx UE 405 and/or the Rx/Tx UE 410 may correspond to one or more UEs described elsewhere herein, such as the UE 305-1 and 305-2 of FIG. 3. A direct link between UEs 405 and 410 (e.g., via a PC5 interface) may be referred to as a sidelink, and a direct link between a network node 415 and a UE 405 and/or 410 (e.g., via a Uu interface) may be referred to as an access link. Sidelink communications may be transmitted via the sidelink, and access link communications may be transmitted via the access link. An access link communication may be a downlink communication (from a network node 415 to a UE 405 and/or 410) and/or an uplink communication (from a UE 405 and/or 410 to a network node 415).

In some cases, the network node 415 may utilize configured grants (CGs) for scheduling and/or allocating resources for sidelink communications. For example, a transmitting UE (e.g., the Tx/Rx UE 405) can request a set of resources. If a grant can be obtained from the network node 415, then the requested resources are reserved in a periodic manner. The network node 415 can configure the Tx/Rx UE 405 with periodic CG occasions (e.g., sidelink transmission opportunities). Each CG occasion can be associated with the resources granted by the network node 415 (e.g., specifying specific periodic slots in the time domain and/or specific sub-channels in the frequency domain for sidelink communications). The Tx/Rx UE 405 can transmit a PSCCH and/or a PSSCH in an upcoming CG occasion. In some cases, the Tx/Rx UE 405 can report a CG sidelink transmission to the network node 415 to request a dynamic grant for retransmissions.

Sidelink CGs for Mode 1 channel access (e.g., where a network node, a hub UE, and/or the like, grants the CGs to UEs for sidelink communications) can allocate specific resources associated with the CGs. In some cases, the Tx/Rx UE 405 can be configured with a CG that indicates a set of time-frequency resources for the Tx/Rx UE 405 to use for sidelink transmissions. The set of time-frequency resources can be per CG occasion. The CG occasions can be configured periodically (e.g., CG occasions can be configured to occur according to a periodic schedule). The Tx/Rx UE 405 can receive both time domain resources and frequency domain resources associated with the sidelink CG using radio resource control (RRC) signaling.

In some cases, the network node 415 can allocate CGs for Mode 2 channel access. The Tx/Rx UE 405 can select resources from the allocated CG resources for use in transmitting a sidelink communication. For example, the Tx/Rx UE 405 can establish a direct PC5 sidelink connection with the Rx/Tx UE 410. To transmit data on the PC5 link (e.g., via broadcast, multicast or unicast) in such a way as to minimize collisions, the Tx/Rx UE 405 can request resources from the network node 415 such as, for example, by transmitting assistance information to the network node 415.

In some cases, for example, the assistance information can indicate a periodicity of TBs, a TB maximum size, and/or quality of service (QoS) information, among other examples. The network node 415 can configure the resources as a CG based on the request. In some cases, the network node 415 can configure a first type of CG (referred to as a "CG type 1") and/or a second type of CG (referred to as a "CG type 2"). CG type 1 is a type of CG in which the allocated resources can be utilized by the requesting UE immediately and until the CG is released by the network node 415. CG type 2 is a type of CG in which the allocated resources can be used by the requesting UE only after the CG is activated by the network node 415 (e.g., via an activation message transmitted from the network node 415 to the requesting UE) and only until the CG is deactivated by the network node 415 (e.g., via a deactivation message transmitted from the network node 415 to the requesting UE).

In some cases, however, as shown in FIG. 4, the Tx/Rx UE 405 can move out of a network service region 420 associated with the network node 415. The network service region 420 is a geographical region within which the Tx/Rx UE 405 can receive service from the network node 415. A Tx/Rx UE 405 can receive service from the network node 415 if the network node 415 can transmit communications to the Tx/Rx UE 405 and/or receive communications from the Tx/Rx UE 405. Therefore, when the Tx/Rx UE 405 is located outside of the network service region 420, the Tx/Rx UE 405 can be unable to request and/or receive CGs from the network node 415 for sidelink communications. As a result, allowing UEs to move into and out of network service regions as the UEs and/or the network nodes providing the network services move can cause disruptions in sidelink communications, thereby having a negative impact on network performance.

Some aspects of the techniques and apparatuses described herein may provide for requesting sidelink resources for sidelink communications outside of a network service region. For example, in some aspects, a UE may determine a prediction that the UE will leave a network service region. The UE may transmit assistance information to a network node based at least in part on the prediction and may receive an allocation of a set of sidelink resources before the UE leaves the network service region. In this way, the UE can obtain sidelink resources to use for sidelink communications while the UE is outside of the network service region, thereby reducing sidelink communication disruptions and having a positive impact on network performance.

In some aspects, a first UE may determine that the first UE is already located outside of a network service region. In some aspects, the first UE may determine that a second UE is within the network service region and may establish a unicast connection with the second UE. For instance, the first UE may determine that the second UE is within a network service region based at least in part on a value of in-coverage field of a sidelink-synchronization signal block (S-SSB) transmitted by the second UE. The first UE may transmit an indication of a sidelink resource preference to the second UE, which may transmit assistance information, based on the resource preference, to the network node. The network node can transmit an allocation of resources to the second UE, which may transmit an indication of the resources to the first UE. In this way, the UE can obtain sidelink resources to use for sidelink communications while the UE is outside of the network service region, thereby reducing sidelink communication disruptions and having a positive impact on network performance.

As indicated above, FIG. 4 is provided as an example. Other examples may differ from what is described with respect to FIG. 4.

Figure 5:
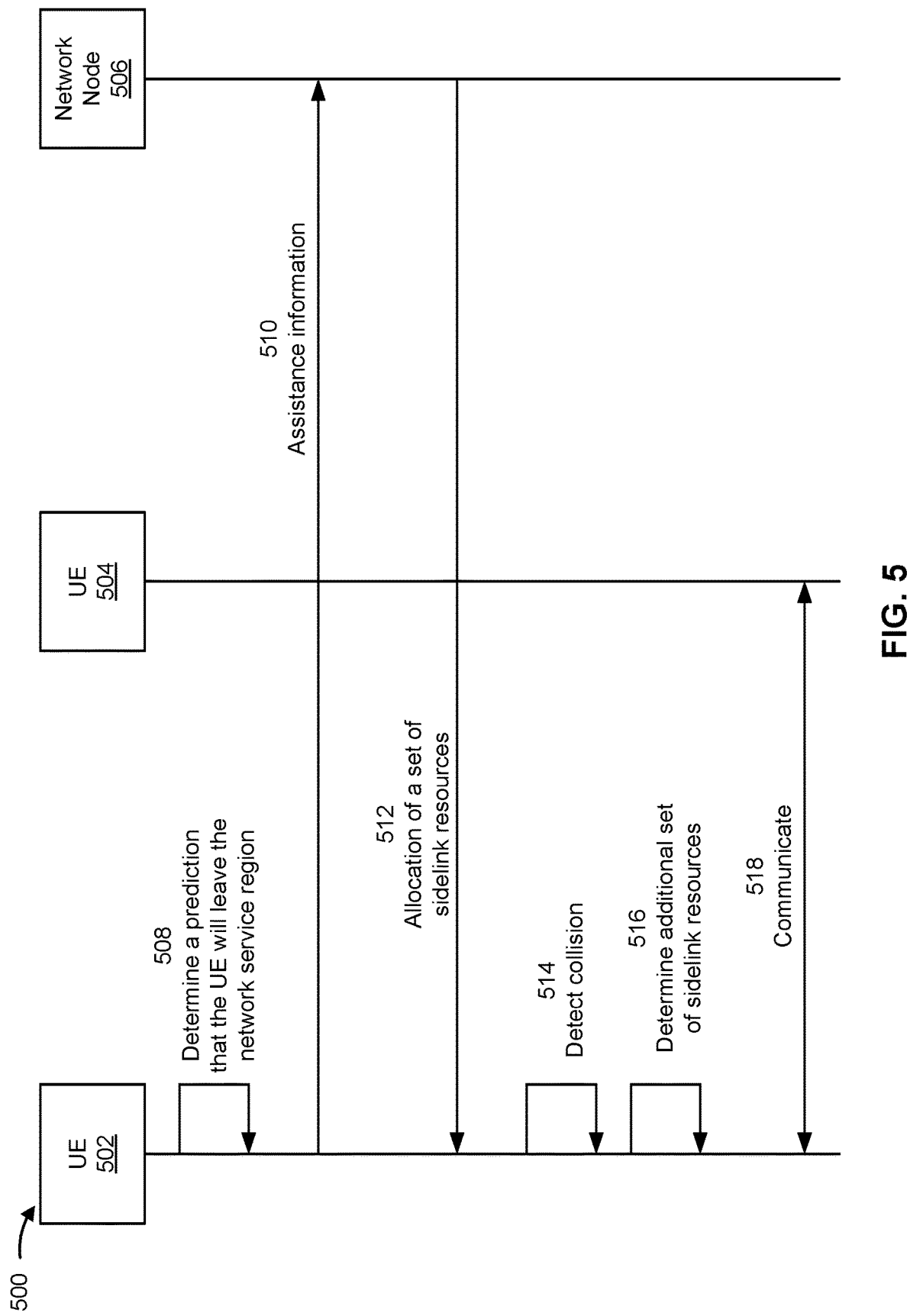
FIGS. 5 and 6 are diagrams illustrating examples associated with requesting sidelink resources for sidelink communications outside of a network service region, in accordance with the present disclosure.

FIG. 5 is a diagram illustrating an example 500 associated with requesting sidelink resources for sidelink communications outside of a network service region, in accordance with the present disclosure. As shown in FIG. 5, a UE 502, a UE 504, and a network node 506 may communicate with one another. The UE 502 and the UE 504 may communicate with one another via a sidelink network. The UE 502 and/or the UE 504 may communicate with the network node 506 via an access link. In some aspects, the UE 502 and/or the UE 504 may be, be similar to, include, or be included in the UE 120 depicted in FIG. 2. In some aspects, the network node 506 may be, be similar to, include, or be included in the base station 110 depicted in FIGS. 1 and 2.

As shown by reference number 508, the UE 502 may determine a prediction that the UE 502 will leave a network service region. In some aspects, the UE 502 may determine the prediction that the UE 502 will leave the network service region based at least in part on a determination that the UE 502 is located near a cell edge, an environmental metric based at least in part on a radar device, historical information associated with movement of the UE 502, location information associated with a global navigation satellite system, and/or location information associated with a map, among other examples.

For example, in some aspects, the UE 502 may determine, based on location services available from the network node 506 and/or measurements corresponding to signals received from the network node 506, that the UE 502 is located near a cell edge. The cell may correspond to the network service region. In some aspects, the UE 502 may determine that the UE 502 is moving closer to the cell edge, and thus may determine a prediction that the UE 502 will move outside of the cell (e.g., the network service region) within a predicted amount of time. In some aspects, the UE 502 may request sidelink resources based at least in part on the predicted amount of time satisfying a threshold.

In some aspects, the UE 502 may determine a prediction that the UE 502 will leave a network service region using a radio detection and ranging (referred to as "radar") device and/or a light detection and ranging (LIDAR) device, or other similar device for determining ranges and/or proximity to objects, among other examples. In some aspects, for example, the UE 502 may determine an environmental metric based at least in part on the radar (or other range or object detection) device. The environmental metric may be, for example, a distance between the UE 502 and an object such as a wall. In some aspects, for example, the UE 502 may determine, based at least in part on the environmental metric, that the UE 502 is moving toward an indoor environment. In some aspects, the UE 502 may determine a prediction that the environmental metric will satisfy an environmental metric criterion within a predicted amount of time. In some aspects, the UE 502 may request sidelink resources based at least in part on the predicted amount of time satisfying a threshold.

In some aspects, as indicated above, the UE 502 may determine the prediction based at least in part on historical information associated with movement of the UE 502, location information associated with a global navigation satellite system, and/or location information associated with a map. For example, in some aspects, the UE 502 may use a global navigation satellite system to determine a position and/or velocity of the UE 502. The velocity of the UE 502 may include speed and information associated with the direction in which the UE 502 is moving and/or the direction in which the network service region is moving relative to the UE 502. The UE 502 may use the position and/or velocity information to determine a prediction that the UE 502 will be moving outside of the network service area. In some aspects, the UE 502 may determine, based at least in part on a map, a prediction that the UE 502 will move to a region represented in the map that corresponds to a region outside of the network service region. In some aspects, the UE 502 may store historical location information, historical velocity information, historical map information, historical network service connection information, and/or any other historical information about the movements of the UE 502. Based at least in part on the historical information, the UE 502 may determine a prediction that the UE 502 is moving toward a region that, historically, has been associated with a region outside of a network service area. In some aspects, for example, the UE 502 may determine patterns of motion associated with the UE 502 and associated patterns of network service loss.

As shown by reference number 510, the UE 502 may transmit, and the network node 506 may receive, assistance information. The assistance information may be a request for sidelink resources. In some aspects, the assistance information may include, for example, an indication of preferred sidelink resources. The UE 502 may transmit the assistance information while the UE 502 is located in a network service region and based at least in part on the prediction that the UE 502 will leave the network service region. As shown by reference number 512, the network node 506 may transmit, and the UE 502 may receive, based at least in part on the assistance information, an allocation of a set of sidelink resources. The allocation may include at least one of a Type 1 configured grant or a Type 2 configured grant.

As shown by reference number 514, the UE 502 may detect a collision associated with the set of sidelink resources. In some aspects, the detection of the collision may be based at least in part on a detection that an amount of energy associated with the set of sidelink resources satisfies an energy threshold. In some aspects, the detection of the collision is based at least in part on a detection that a block error rate (BLER) associated with the set of sidelink resources satisfies a BLER threshold. In some aspects, the UE 502 may monitor for collisions associated with the set of sidelink resources continuously, continually, and/or periodically. For example, the UE 502 may compare energy associated with sidelink resources even after a communication with the UE 504 is established. In some aspects, the UE 502 may monitor for collisions until the UE 502 moves into a network service region and/or until a collision is detected.

As shown by reference number 516, the UE 502 may determine, using an autonomous resource selection operation (e.g., the Mode 2 selection operation described above in connection with FIG. 3), an additional set of sidelink resources based at least in part on the detection of the collision associated with the set of sidelink resources. As shown by reference number 518, the UE 502 may communicate with the UE 504 based at least in part on the set of sidelink resources and/or the additional set of sidelink resources.

As indicated above, FIG. 5 is provided as an example. Other examples may differ from what is described with respect to FIG. 5.

Figure 6:
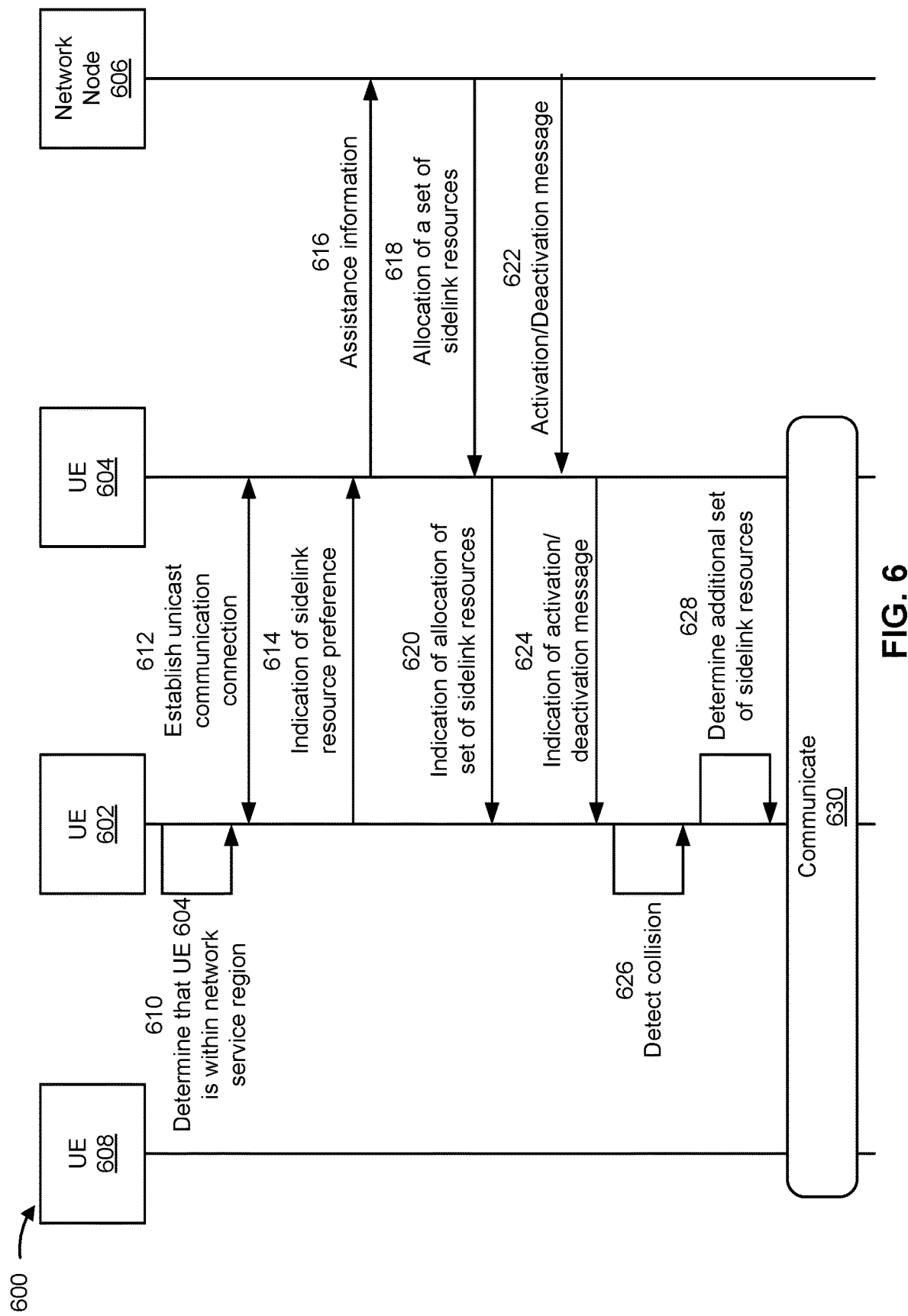

FIG. 6 is a diagram illustrating an example 600 associated with requesting sidelink resources for sidelink communications outside of a network service region, in accordance with the present disclosure. As shown in FIG. 6, a UE 602, a UE 604, and a network node 606 may communicate with one another. The UE 602 and the UE 604 may communicate with one another via a sidelink network. The UE 602 and/or the UE 604 may communicate with the network node 606 via an access link. In some aspects, the UE 602 and/or the UE 604 may be, be similar to, include, or be included in the UE 502 and/or the UE 502 depicted in FIG. 5. In some aspects, the network node 606 may be, be similar to, include, or be included in the network node 506 depicted in FIG. 5.

As shown by reference number 610, the UE 602 may determine that the UE 604 is within a network service region (e.g., associated with the network node 606). As shown by reference number 612, the UE 602 and the UE 604 may establish a unicast communication connection with one another. As shown by reference number 614, the UE 602 may transmit, and the UE 604 may receive, an indication of a sidelink resource preference. The indication of the sidelink preference may include a request for sidelink resources and may be based at least in part on the determination that the UE 604 is within the network service region. In some aspects, the UE 602 may establish the unicast connection and transmit the indication of the sidelink preference based at least in part on the UE 602 being located outside of a network service region, based at least in part on the UE 602 determining that the UE 602 has not been allocated enough resources from a network node (e.g., the network node 606) to facilitate a scheduled, or potentially-scheduled, task, and/or based at least in part on the UE 602 using a relay device to communicate with another UE and/or the network node 606, among other examples.

As shown by reference number 616, the UE 604 may transmit, and the network node 606 may receive assistance information indicating the sidelink resource preference. As shown by reference number 618, the network node 606 may transmit, and the UE 604 may receive, an allocation of a set of sidelink resources. As shown by reference number 620, the UE 604 may transmit, and the UE 602 may receive, an indication of the allocation of the set of sidelink resources. The UE 604 may transmit the indication of the allocation of the set of sidelink resources based at least in part on receiving the indication of the sidelink resource preference.

In some aspects, if the UE 602 determines that the unicast connection with the UE 604 is lost prior to receiving the indication of the set of sidelink resources and/or an indication of an activation message associated with the set of sidelink resources, the UE 602 may revert to an autonomous resource selection operation (e.g., the Mode 2 resource selection operation described above in connection with FIG. 3).

As shown by reference number 622, the network node 606 may transmit, and the UE 604 may receive, at least one of an activation message associated with the set of sidelink resources or a deactivation message associated with the set of sidelink resources. As shown by reference number 624, the UE 604 may transmit, and the UE 602 may receive, at least one of an indication of the activation message or an indication of the deactivation message.

As shown by reference number 626, the UE 602 may detect a collision associated with the set of sidelink resources. For example, the UE 602 may perform a collision detection operation associated with the set of sidelink resources. In some aspects, the UE 602 may perform the collision detection operation based at least in part on a determination of a failure of a unicast communication connection with the UE 604. In some aspects, the detection of the collision is based at least in part on a detection of an amount of energy associated with the set of sidelink resources that satisfies an energy threshold. In some aspects, the detection of the collision is based at least in part on a detection of a BLER associated with the set of sidelink resources that satisfies a BLER threshold.

As shown by reference number 628, the UE 602 may determine, using an autonomous resource selection operation, an additional set of sidelink resources based at least in part on detection of a collision associated with the set of sidelink resources. As described above, the UE 602 may monitor for collisions continuously and/or continually (e.g., until the UE 602 moves into a network service region and/or until a collision is detected). As shown by reference number 630, the UE 602 may communicate with at least one of the UE 604 or an additional UE 608 based at least in part on the set of sidelink resources and/or the additional set of sidelink resources.

As indicated above, FIG. 6 is provided as an example. Other examples may differ from what is described with respect to FIG. 6.

Figure 7:
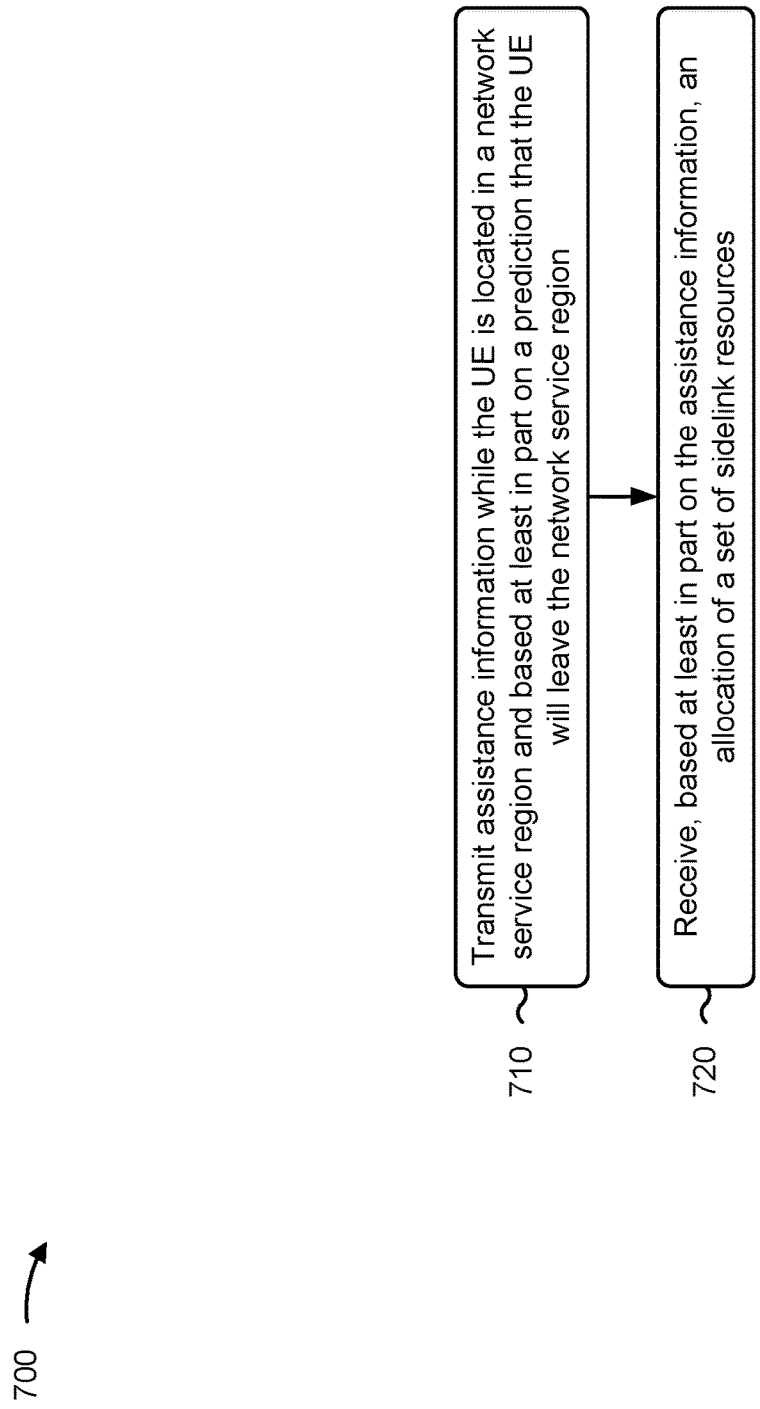
FIGS. 7-9 are diagrams illustrating example processes associated with requesting sidelink resources for sidelink communications outside of a network service region, in accordance with the present disclosure.

FIG. 7 is a diagram illustrating an example process 700 performed, for example, by a UE, in accordance with the present disclosure. Example process 700 is an example where the UE (e.g., UE 502) performs operations associated with requesting sidelink resources for sidelink communications outside of a network service region.

As shown in FIG. 7, in some aspects, process 700 may include transmitting assistance information while the UE is located in a network service region and based at least in part on a prediction that the UE will leave the network service region (block 710). For example, the UE (e.g., using communication manager 1008 and/or transmission component 1004, depicted in FIG. 10) may transmit assistance information while the UE is located in a network service region and based at least in part on a prediction that the UE will leave the network service region, as described above.

As further shown in FIG. 7, in some aspects, process 700 may include receiving, based at least in part on the assistance information, an allocation of a set of sidelink resources (block 720). For example, the UE (e.g., using communication manager 1008 and/or reception component 1002, depicted in FIG. 10) may receive, based at least in part on the assistance information, an allocation of a set of sidelink resources, as described above.

Process 700 may include additional aspects, such as any single aspect or any combination of aspects described below and/or in connection with one or more other processes described elsewhere herein.

In a first aspect, process 700 includes communicating with an additional UE based at least in part on the set of sidelink resources. In a second aspect, alone or in combination with the first aspect, the prediction that the UE will leave the network service region is based at least in part on at least one of a determination that the UE is located near a cell edge, an environmental metric based at least in part on a radar device, historical information associated with movement of the UE, location information associated with a global navigation satellite system, or location information associated with a map. In a third aspect, alone or in combination with one or more of the first and second aspects, the allocation comprises at least one of a Type 1 configured grant or a Type 2 configured grant.

In a fourth aspect, alone or in combination with one or more of the first through third aspects, process 700 includes determining, using an autonomous resource selection operation, an additional set of sidelink resources based at least in part on a detection of a collision associated with the set of sidelink resources. In a fifth aspect, alone or in combination with the fourth aspect, the detection of the collision is based at least in part on a detection that an amount of energy associated with the set of sidelink resources satisfies an energy threshold. In a sixth aspect, alone or in combination with one or more of the fourth or fifth aspects, the detection of the collision is based at least in part on a detection that a BLER associated with the set of sidelink resources satisfies a BLER threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
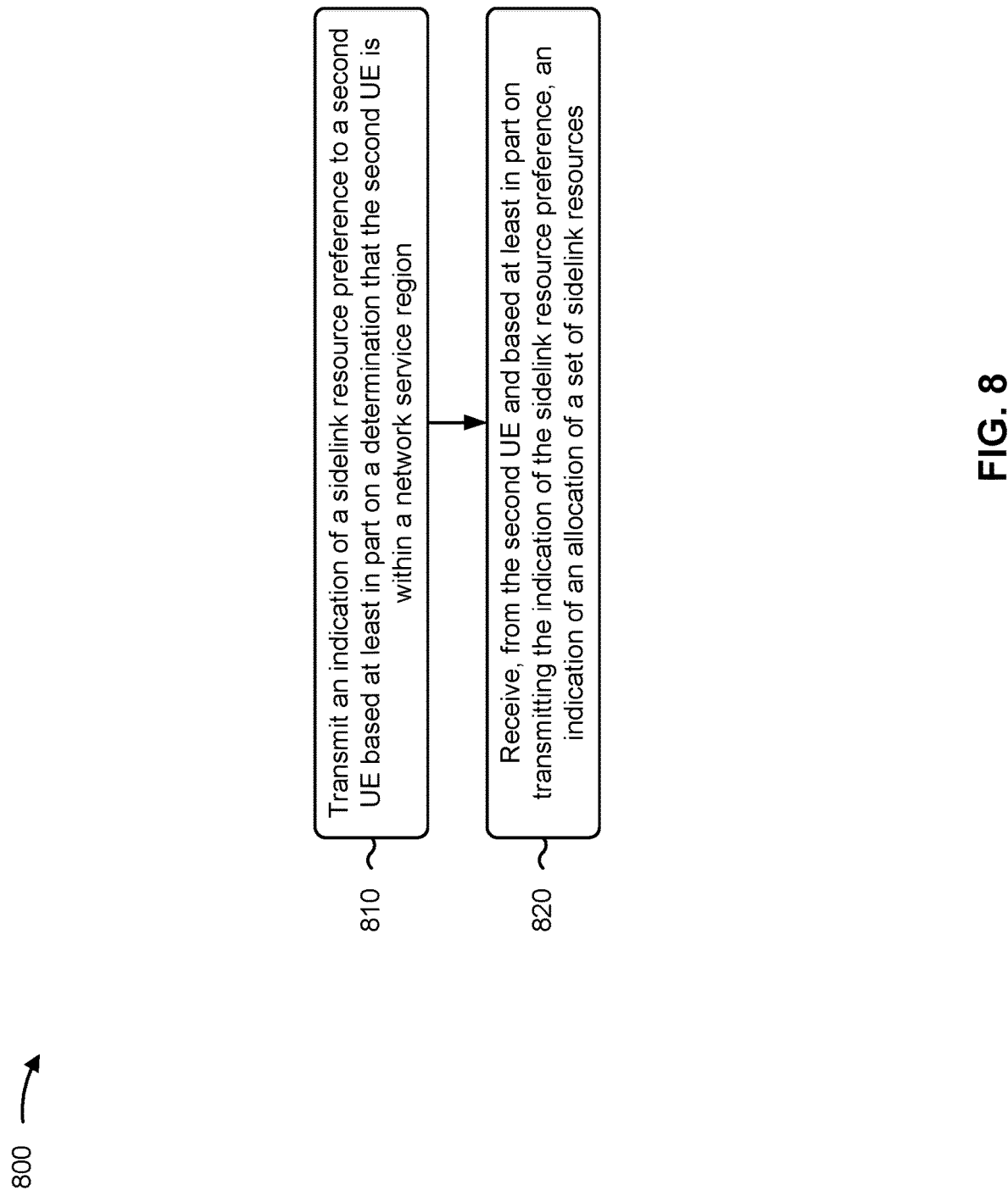

FIG. 8 is a diagram illustrating an example process 800 performed, for example, by a first UE, in accordance with the present disclosure. Example process 800 is an example where the first UE (e.g., UE 602) performs operations associated with requesting sidelink resources for sidelink communications outside of a network service region.

As shown in FIG. 8, in some aspects, process 800 may include transmitting an indication of a sidelink resource preference to a second UE based at least in part on a determination that the second UE is within a network service region (block 810). For example, the first UE (e.g., using communication manager 1008 and/or transmission component 1004, depicted in FIG. 10) may transmit an indication of a sidelink resource preference to a second UE based at least in part on a determination that the second UE is within a network service region, as described above.

As further shown in FIG. 8, in some aspects, process 800 may include receiving, from the second UE and based at least in part on transmitting the indication of the sidelink resource preference, an indication of an allocation of a set of sidelink resources (block 820). For example, the first UE (e.g., using communication manager 1008 and/or reception component 1002, depicted in FIG. 10) may receive, from the second UE and based at least in part on transmitting the indication of the sidelink resource preference, an indication of an allocation of a set of sidelink resources, as described above.

Process 800 may include additional aspects, such as any single aspect or any combination of aspects described below and/or in connection with one or more other processes described elsewhere herein.

In a first aspect, process 800 includes establishing a unicast communication connection with the second UE. In a second aspect, alone or in combination with the first aspect, process 800 includes receiving, from the second UE, at least one of an activation indication associated with the set of sidelink resources or a deactivation indication associated with the set of sidelink resources. In a third aspect, alone or in combination with one or more of the first and second aspects, process 800 includes performing a collision detection operation associated with the set of sidelink resources based at least in part on a determination of a failure of a unicast communication connection with the second UE.

In a fourth aspect, alone or in combination with one or more of the first through third aspects, process 800 includes determining, using an autonomous resource selection operation, an additional set of sidelink resources based at least in part on detection of a collision associated with the set of sidelink resources. In a fifth aspect, alone or in combination with the fourth aspect, the detection of the collision is based at least in part on a detection of an amount of energy associated with the set of sidelink resources that satisfies an energy threshold. In a sixth aspect, alone or in combination with one or more of the fourth or fifth aspects, the detection of the collision is based at least in part on a detection of a BLER associated with the set of sidelink resources that satisfies a BLER threshold. In a seventh aspect, alone or in combination with one or more of the first through sixth aspects, process 800 includes communicating with at least one of the second UE or a third UE based at least in part on the set of sidelink resources.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
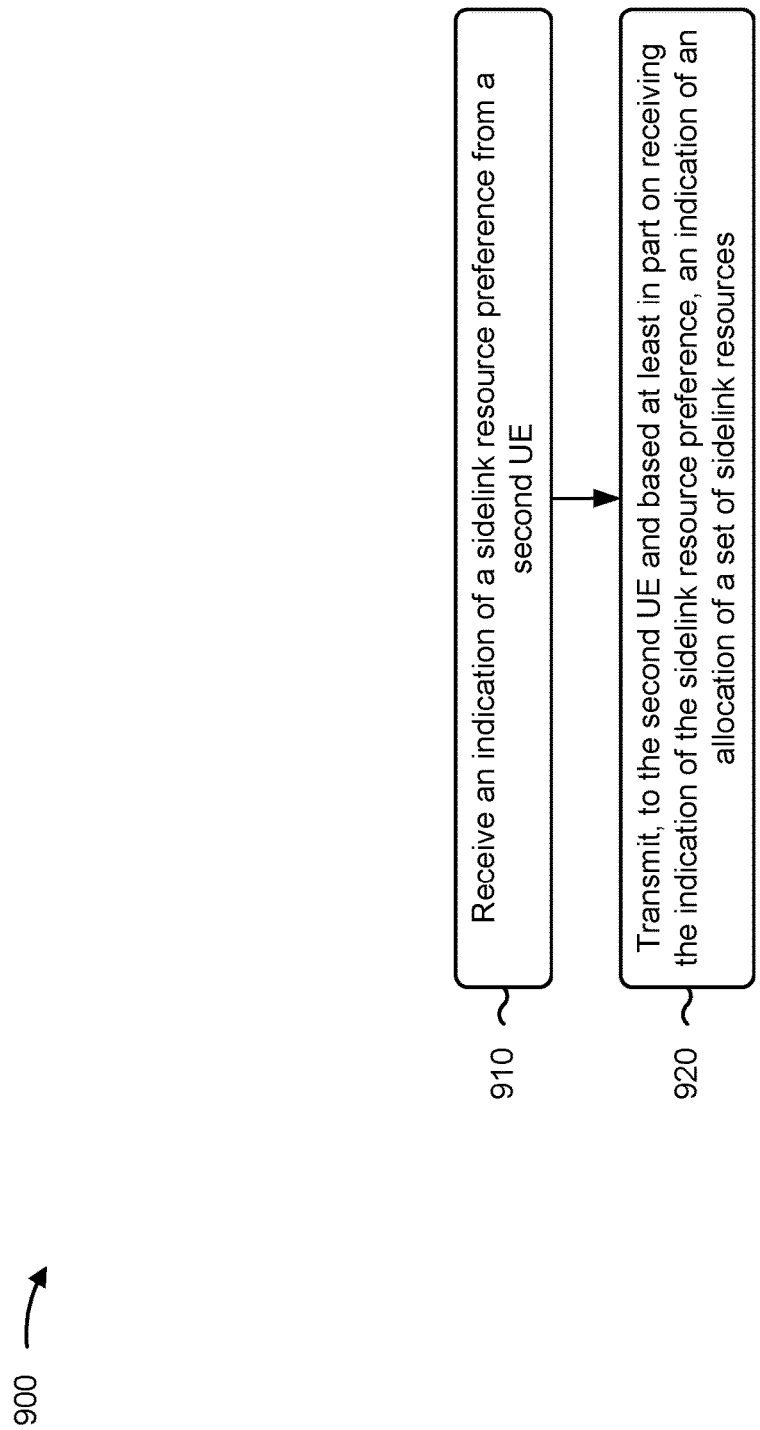

FIG. 9 is a diagram illustrating an example process 900 performed, for example, by a first UE, in accordance with the present disclosure. Example process 900 is an example where the first UE (e.g., UE 604) performs operations associated with requesting sidelink resources for sidelink communications outside of a network service region.

As shown in FIG. 9, in some aspects, process 900 may include receiving an indication of a sidelink resource preference from a second UE (block 910). For example, the first UE (e.g., using communication manager 1008 and/or reception component 1002, depicted in FIG. 10) may receive an indication of a sidelink resource preference from a second UE, as described above.

As further shown in FIG. 9, in some aspects, process 900 may include transmitting, to the second UE and based at least in part on receiving the indication of the sidelink resource preference, an indication of an allocation of a set of sidelink resources (block 920). For example, the first UE (e.g., using communication manager 1008 and/or transmission component 1004, depicted in FIG. 10) may transmit, to the second UE and based at least in part on receiving the indication of the sidelink resource preference, an indication of an allocation of a set of sidelink resources, as described above.

Process 900 may include additional aspects, such as any single aspect or any combination of aspects described below and/or in connection with one or more other processes described elsewhere herein.

In a first aspect, process 900 includes transmitting, to a network node, assistance information indicating the sidelink resource preference, and receiving, from the network node, the allocation of the set of sidelink resources. In a second aspect, alone or in combination with the first aspect, process 900 includes establishing a unicast communication connection with the second UE. In a third aspect, alone or in combination with one or more of the first and second aspects, process 900 includes receiving, from a network node, at least one of an activation message associated with the set of sidelink resources or a deactivation message associated with the set of sidelink resources, and transmitting, to the second UE, at least one of an indication of the activation message or an indication of the deactivation message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
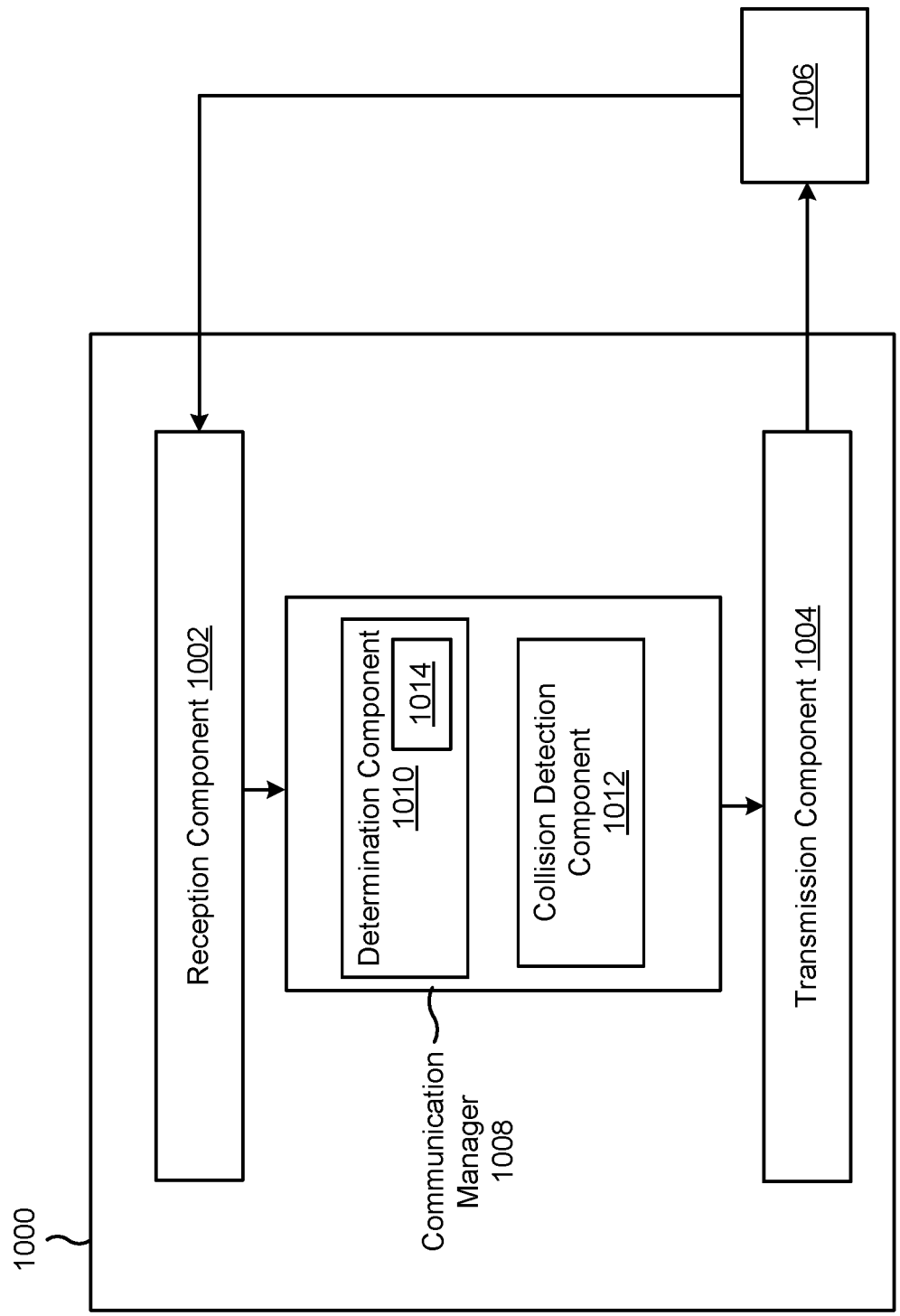
FIG. 10 is a diagram of an example apparatus for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network node, or another wireless communication device) using the reception component 1002 and the transmission component 1004. As further shown, the apparatus 1000 may include the communication manager 1008. The communication manager 1008 may include one or more of a determination component 1010 or a collision detection component 1012, among other examples.

In some aspects, the apparatus 1000 may be configured to perform one or more operations described herein in connection with FIGS. 5 and 6. Additionally, or alternatively, the apparatus 1000 may be configured to perform one or more processes described herein, such as process 700 of FIG. 7, process 800 of FIG. 8, process 900 of FIG. 9, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The transmission component 1004 may transmit assistance information while the UE is located in a network service region and based at least in part on a prediction that the UE will leave the network service region. In some aspects, the determination component 1010 may determine the prediction that the UE will leave the network service region. In some aspects, the determination component 1010 may include one or more antennas, a modem, a transmit processor, a controller/processor, a memory, a radar device 1014, or a combination thereof, of the UE described in connection with FIG. 2. In some aspects, the determination component 1010 may include the reception component 1002 and/or the transmission component 1004.

The reception component 1002 may receive, based at least in part on the assistance information, an allocation of a set of sidelink resources. The communication manager 1008, the reception component 1002, and/or the transmission component 1004 may communicate with an additional UE based at least in part on the set of sidelink resources. In some aspects, the communication manager 1008 may include one or more antennas, a modem, a transmit processor, a controller/processor, a memory, or a combination thereof, of the UE described in connection with FIG. 2. In some aspects, the communication manager 1008 may be, be similar to, include, or be included in, the communication manager 140, depicted in FIGS. 1 and 2. In some aspects, the communication manager 1008 may include the reception component 1002 and/or the transmission component 1004.

The determination component 1010 may determine, using an autonomous resource selection operation, an additional set of sidelink resources based at least in part on a detection of a collision associated with the set of sidelink resources. The transmission component 1004 may transmit an indication of a sidelink resource preference to a second UE based at least in part on a determination that the second UE is within a network service region. The reception component 1002 may receive, from the second UE and based at least in part on transmitting the indication of the sidelink resource preference, an indication of an allocation of a set of sidelink resources.

The communication manager 1008, the reception component 1002, and/or the transmission component 1004 may establish a unicast communication connection with the second UE. The reception component 1002 may receive, from the second UE, at least one of an activation indication associated with the set of sidelink resources or a deactivation indication associated with the set of sidelink resources. The collision detection component 1012 may perform a collision detection operation associated with the set of sidelink resources based at least in part on a determination of a failure of a unicast communication connection with the second UE. In some aspects, the collision detection component 1012 may include one or more antennas, a modem, a transmit processor, a controller/processor, a memory, or a combination thereof, of the UE described in connection with FIG. 2. In some aspects, the collision detection component 1012 may include the reception component 1002 and/or the transmission component 1004.

The determination component 1010 may determine, using an autonomous resource selection operation, an additional set of sidelink resources based at least in part on detection of a collision associated with the set of sidelink resources. The communication manager 1008, the reception component 1002, and/or the transmission component 1004 may communicate with at least one of the second UE or a third UE based at least in part on the set of sidelink resources.

The reception component 1002 may receive an indication of a sidelink resource preference from a second UE. The transmission component 1004 may transmit, to the second UE and based at least in part on receiving the indication of the sidelink resource preference, an indication of an allocation of a set of sidelink resources.

The transmission component 1004 may transmit, to a network node, assistance information indicating the sidelink resource preference. The reception component 1002 may receive, from the network node, the allocation of the set of sidelink resources. The communication manager 1008, the reception component 1002, and/or the transmission component 1004 may establish a unicast communication connection with the second UE. The reception component 1002 may receive, from a network node, at least one of an activation message associated with the set of sidelink resources or a deactivation message associated with the set of sidelink resources. The transmission component 1004 may transmit, to the second UE, at least one of an indication of the activation message or an indication of the deactivation message.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting assistance information while the UE is located in a network service region and based at least in part on a prediction that the UE will leave the network service region; and receiving, based at least in part on the assistance information, an allocation of a set of sidelink resources.

Aspect 2: The method of Aspect 1, further comprising communicating with an additional UE based at least in part on the set of sidelink resources.

Aspect 3: The method of either of Aspects 1 or 2, wherein the prediction that the UE will leave the network service region is based at least in part on at least one of: a determination that the UE is located near a cell edge, an environmental metric based at least in part on a radar device, historical information associated with movement of the UE, location information associated with a global navigation satellite system, or location information associated with a map.

Aspect 4: The method of any of Aspects 1-3, wherein the allocation comprises at least one of a Type 1 configured grant or a Type 2 configured grant.

Aspect 5: The method of any of Aspects 1-4, further comprising determining, using an autonomous resource selection operation, an additional set of sidelink resources based at least in part on a detection of a collision associated with the set of sidelink resources.

Aspect 6: The method of Aspect 5, wherein the detection of the collision is based at least in part on a detection that an amount of energy associated with the set of sidelink resources satisfies an energy threshold.

Aspect 7: The method of either of Aspects 5 or 6, wherein the detection of the collision is based at least in part on a detection that a block error rate (BLER) associated with the set of sidelink resources satisfies a BLER threshold.

Aspect 8: A method of wireless communication performed by a first user equipment (UE), comprising: transmitting an indication of a sidelink resource preference to a second UE based at least in part on a determination that the second UE is within a network service region; and receiving, from the second UE and based at least in part on transmitting the indication of the sidelink resource preference, an indication of an allocation of a set of sidelink resources.

Aspect 9: The method of Aspect 8, further comprising establishing a unicast communication connection with the second UE.

Aspect 10: The method of either of Aspects 8 or 9, further comprising receiving, from the second UE, at least one of an activation indication associated with the set of sidelink resources or a deactivation indication associated with the set of sidelink resources.

Aspect 11: The method of any of Aspects 8-10, further comprising performing a collision detection operation associated with the set of sidelink resources based at least in part on a determination of a failure of a unicast communication connection with the second UE.

Aspect 12: The method of any of Aspects 8-11, further comprising determining, using an autonomous resource selection operation, an additional set of sidelink resources based at least in part on detection of a collision associated with the set of sidelink resources.

Aspect 13: The method of Aspect 12, wherein the detection of the collision is based at least in part on a detection of an amount of energy associated with the set of sidelink resources that satisfies an energy threshold.

Aspect 14: The method of either of Aspects 12 or 13, wherein the detection of the collision is based at least in part on a detection of a block error ratio (BLER) associated with the set of sidelink resources that satisfies a BLER threshold.

Aspect 15: The method of any of Aspects 8-14, further comprising communicating with at least one of the second UE or a third UE based at least in part on the set of sidelink resources.

Aspect 16: A method of wireless communication performed by a first user equipment (UE), comprising: receiving an indication of a sidelink resource preference from a second UE; and transmitting, to the second UE and based at least in part on receiving the indication of the sidelink resource preference, an indication of an allocation of a set of sidelink resources.

Aspect 17: The method of Aspect 16, further comprising: transmitting, to a network node, assistance information indicating the sidelink resource preference; and receiving, from the network node, the allocation of the set of sidelink resources.

Aspect 18: The method of either of Aspects 16 or 17, further comprising establishing a unicast communication connection with the second UE.

Aspect 19: The method of any of Aspects 16-18, further comprising: receiving, from a network node, at least one of an activation message associated with the set of sidelink resources or a deactivation message associated with the set of sidelink resources; and transmitting, to the second UE, at least one of an indication of the activation message or an indication of the deactivation message.

Aspect 20: An apparatus for wireless communication at a device, comprising a processor; memory coupled with the processor; and instructions stored in the memory and executable by the processor to cause the apparatus to perform the method of one or more of Aspects 1-7.

Aspect 21: A device for wireless communication, comprising a memory and one or more processors coupled to the memory, the one or more processors configured to perform the method of one or more of Aspects 1-7.

Aspect 22: An apparatus for wireless communication, comprising at least one means for performing the method of one or more of Aspects 1-7.

Aspect 23: A non-transitory computer-readable medium storing code for wireless communication, the code comprising instructions executable by a processor to perform the method of one or more of Aspects 1-7.

Aspect 24: A non-transitory computer-readable medium storing a set of instructions for wireless communication, the set of instructions comprising one or more instructions that, when executed by one or more processors of a device, cause the device to perform the method of one or more of Aspects 1-7.

Aspect 25: An apparatus for wireless communication at a device, comprising a processor; memory coupled with the processor; and instructions stored in the memory and executable by the processor to cause the apparatus to perform the method of one or more of Aspects 8-15.

Aspect 25: A device for wireless communication, comprising a memory and one or more processors coupled to the memory, the one or more processors configured to perform the method of one or more of Aspects 8-15.

Aspect 26: An apparatus for wireless communication, comprising at least one means for performing the method of one or more of Aspects 8-15.

Aspect 27: A non-transitory computer-readable medium storing code for wireless communication, the code comprising instructions executable by a processor to perform the method of one or more of Aspects 8-15.

Aspect 28: A non-transitory computer-readable medium storing a set of instructions for wireless communication, the set of instructions comprising one or more instructions that, when executed by one or more processors of a device, cause the device to perform the method of one or more of Aspects 8-15.

Aspect 29: An apparatus for wireless communication at a device, comprising a processor; memory coupled with the processor; and instructions stored in the memory and executable by the processor to cause the apparatus to perform the method of one or more of Aspects 16-19.

Aspect 30: A device for wireless communication, comprising a memory and one or more processors coupled to the memory, the one or more processors configured to perform the method of one or more of Aspects 16-19.

Aspect 31: An apparatus for wireless communication, comprising at least one means for performing the method of one or more of Aspects 16-19.

Aspect 32: A non-transitory computer-readable medium storing code for wireless communication, the code comprising instructions executable by a processor to perform the method of one or more of Aspects 16-19.

Aspect 33: A non-transitory computer-readable medium storing a set of instructions for wireless communication, the set of instructions comprising one or more instructions that, when executed by one or more processors of a device, cause the device to perform the method of one or more of Aspects 16-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising: at least one processor; and at least one memory coupled with the at least one processor and storing processor-readable code that, when executed by the at least one processor, is configured to cause the UE to: establish a unicast communication connection with an additional UE based at least in part on a determination that the additional UE is within a network service region; receive an indication of a sidelink resource preference from the additional UE; transmit assistance information while the UE is located in the network service region and based at least in part on a determination of a prediction that the UE will leave the network service region, wherein the assistance information indicates the sidelink resource preference; and receive, based at least in part on the assistance information, an allocation of a set of sidelink resources.

2. The UE of claim 1, wherein the at least one memory further stores processor-readable code configured to cause the UE to communicate with the additional UE based at least in part on the set of sidelink resources.

3. The UE of claim 1, wherein the prediction that the UE will leave the network service region is based at least in part on at least one of:
a determination that the UE is located near a cell edge,
an environmental metric based at least in part on a radar device,
historical information associated with movement of the UE,
location information associated with a global navigation satellite system, or
location information associated with a map.

4. The UE of claim 1, wherein the allocation comprises at least one of a Type 1 configured grant or a Type 2 configured grant.

5. The UE of claim 1, wherein the at least one memory further stores processor-readable code configured to cause the UE to determine, using an autonomous resource selection operation, an additional set of sidelink resources based at least in part on a detection of a collision associated with the set of sidelink resources.

6. The UE of claim 5, wherein the detection of the collision is based at least in part on a detection that an amount of energy associated with the set of sidelink resources satisfies an energy threshold.

7. The UE of claim 5, wherein the detection of the collision is based at least in part on a detection that a block error rate (BLER) associated with the set of sidelink resources satisfies a BLER threshold.

8. The UE of claim 5, wherein the at least one memory further stores processor-readable code configured to cause the UE to:
communicate with the additional UE or a third UE based at least in part on the set of sidelink resources or the additional set of sidelink resources.

9. A first user equipment (UE) for wireless communication, comprising: at least one processor; and at least one memory coupled with the at least one processor and storing processor-readable code that, when executed by the at least one processor, is configured to cause the first UE to: establish a unicast communication connection with a second UE based at least in part on a determination that the second UE is within a network service region; transmit an indication of a sidelink resource preference to the second UE based at least in part on a predication of a determination that the second UE will leave the network service region; receive, from the second UE and based at least in part on transmitting the indication of the sidelink resource preference, an indication of an allocation of a set of sidelink resources; receive, from the second UE, at least one of an activation indication associated with the set of sidelink resources, or a deactivation indication associated with the set of sidelink resources; and perform a collision detection operation associated with the set of sidelink resources based at least in part on receiving at least one of the activation indication or the deactivation indication.

10. The first UE of claim 9, wherein the collision detection operation is performed further based at least in part on a determination of a failure of the unicast communication connection with the second UE.

11. The first UE of claim 9, wherein the at least one memory further stores processor-readable code configured to cause the first UE to:
determine, using an autonomous resource selection operation, an additional set of sidelink resources based at least in part on detection of a collision associated with the set of sidelink resources.

12. The first UE of claim 11, wherein the detection of the collision is based at least in part on a detection of an amount of energy associated with the set of sidelink resources that satisfies an energy threshold.

13. The first UE of claim 12, wherein the detection of the collision is based at least in part on a detection of a block error rate (BLER) associated with the set of sidelink resources that satisfies a BLER threshold.

14. The first UE of claim 9, wherein the at least one memory further stores processor-readable code configured to cause the first UE to:
communicate with at least one of the second UE or a third UE based at least in part on the set of sidelink resources.

15. The first UE of claim 9, wherein to establish the unicast communication connection, the at least one memory further stores processor-readable code configured to cause the UE to:
utilize position information or velocity information of the UE to determine a prediction that the UE will leave the network service region, wherein the unicast communication connection is established based at least in part on the prediction.

16. The first UE of claim 15, wherein the prediction is based at least in part on at least one of:
an environmental metric based at least in part on a radar device,
location information associated with a global navigation satellite system, or
location information associated with a map.

17. A first user equipment (UE) for wireless communication, comprising: at least one processor; and at least one memory coupled with the at least one processor and storing processor-readable code that, when executed by the at least one processor, is configured to cause the first UE to: establish, with a second UE, a unicast communication connection based at least in part on a determination that the second UE is within a network service region; receive an indication of a sidelink resource preference from the second UE based at least in part on a predication of a determination that the second UE will leave the network service region; transmit, to a network node, assistance information indicating the sidelink resource preference; receive, from the network node, an allocation of a set of sidelink resources; and transmit, to the second UE, an indication of the allocation of the set of sidelink resources.

18. The first UE of claim 17, wherein the at least one memory further stores processor-readable code configured to cause the first UE to:
receive, from the network node, at least one of an activation message associated with the set of sidelink resources or a deactivation message associated with the set of sidelink resources; and
transmit, to the second UE, at least one of an indication of the activation message or an indication of the deactivation message.

19. A method of wireless communication performed by a user equipment (UE), comprising: establishing a unicast communication connection with an additional UE based at least in part on a determination that the additional UE is within a network service region; receiving an indication of a sidelink resource preference from the additional UE; transmitting assistance information while the UE is located in the network service region and based at least in part on a determination of a prediction that the UE will leave the network service region, wherein the assistance information indicates the sidelink resource preference; and receiving, based at least in part on the assistance information, an allocation of a set of sidelink resources.

20. The method of claim 19, further comprising:
communicating with a third UE based at least in part on the set of sidelink resources.

21. The method of claim 19, wherein the prediction that the UE will leave the network service region is based at least in part on at least one of:
a determination that the UE is located near a cell edge,
an environmental metric based at least in part on a radar device,
historical information associated with movement of the UE,
location information associated with a global navigation satellite system, or
location information associated with a map.

22. The method of claim 19, further comprising determining, using an autonomous resource selection operation, an additional set of sidelink resources based at least in part on a detection of a collision associated with the set of sidelink resources.

23. The method of claim 22, wherein the detection of the collision is based at least in part on a detection that an amount of energy associated with the set of sidelink resources satisfies an energy threshold.

24. The method of claim 22, wherein the detection of the collision is based at least in part on a detection that a block error rate (BLER) associated with the set of sidelink resources satisfies a BLER threshold.

25. The method of claim 19, wherein the allocation comprises at least one of a Type 1 configured grant or a Type 2 configured grant.

* * * * *